United States Patent
Augustsson

(10) Patent No.: US 6,473,540 B1
(45) Date of Patent: Oct. 29, 2002

(54) DEVICE AND METHOD FOR FILTERING OPTICAL WAVELENGTHS

(75) Inventor: Torsten Augustsson, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/558,148

(22) Filed: Apr. 26, 2000

(30) Foreign Application Priority Data

Apr. 30, 1999 (SE) ............................................. 9901559

(51) Int. Cl.$^7$ ................................................. G02B 6/26
(52) U.S. Cl. .............................. 385/15; 385/37; 385/18
(58) Field of Search .............................. 385/15, 18, 27, 385/37

(56) References Cited

U.S. PATENT DOCUMENTS

| | | | | |
|---|---|---|---|---|
| 5,457,760 A | * | 10/1995 | Mizrahi | 359/115 |
| 5,524,118 A | * | 6/1996 | Kim et al. | 372/22 |
| 5,742,416 A | * | 4/1998 | Mizrahi | 359/130 |
| 5,812,710 A | | 9/1998 | Sugaya | 385/27 |
| 6,055,081 A | * | 4/2000 | Koyano et al. | 359/130 |
| 6,240,222 B1 | * | 5/2001 | Bergmann | 359/117 |

FOREIGN PATENT DOCUMENTS

EP  0 763 907 A1  3/1997

* cited by examiner

Primary Examiner—Ellen E. Kim
(74) Attorney, Agent, or Firm—Burns, Doane, Swecker & Mathis, L.L.P.

(57) ABSTRACT

The present invention relates to a device and to a method for the wavelength selective filtration of optical wavelength channels. The device includes at least one 3 dB-coupler or at least one Q port circulator (40), where Q≧3, a 1×N WDM-(de)multiplexer (30), where N≧2, N number of waveguides (31, 32, 33, 34, 35, 36, 37 and 38), at least N number of reflection sections (61, 62, 63, 64, 65, 66, 67 and 68) and at least N number of variable optical attenuators (71, 72, 73, 74, 75, 76, 77 and 78). One of the ports on the circulator (40) or on the 3 dB-coupler is connected to a first side of the WDM-(de)multiplexer (30). Each waveguide (31, 32, 33, 34, 35, 36, 37 and 38) includes at least one variable optical attenuator (71, 72, 73, 74, 75, 76, 77 and 78) and at least one reflection section (61, 62, 63, 64, 65, 66, 67 and 68), such that at least one variable optical attenuator (71, 72, 73, 74, 75, 76, 77 and 78) will be located between a reflection section (61, 62, 63, 64, 65, 66, 67 and 68) and the WDN-(de)multiplexer (30).

21 Claims, 6 Drawing Sheets

DEVICE AND METHOD FOR FILTERING OPTICAL WAVELENGTHS

FIELD OF INVENTION

The present invention relates to a device and to a method for optical filtering.

BACKGROUND OF THE INVENTION

Various methods are known for improving the capacity of existing optical networks. One method is to use so-called wavelength multiplexing technology (WDM) to improve the extent to which an optical fibre in the optical network can utilise available bandwidths. The wavelength can also be used as an information address in an optical network, in other words the information can be multiplexed on a number of channels which can then be processed individually in the network. This can cause different channels to be subjected to losses of different magnitudes, among other things because the different channels are attenuated to different extents in the filter and switching structures, pass through the network along paths of mutually different lengths, or are amplified to different extents in optical amplifiers. This imbalance can impair the quality of the transmitted information, due to the fact that a channel that has a low power level is easily disturbed by a channel that has a high power level, this phenomenon normally being referred to as crosstalk.

Consequently, it is desirable to incorporate in an optical network tuneable filters which will enable undesirable channels to be suppressed while amplifying desired channels.

Devices constructed in accordance with the present standpoint of techniques for tuneable filtering of optical channels are generally encumbered with one or more of the following defects:

Relatively high losses with respect to desired channels and poor suppression of remaining channels.

Other defects include reflections in the device which impair performance and cause disturbances in the transmission system as a whole.

Another drawback is that wavelength channels are filtered only over a narrow wavelength band.

Another drawback is that these known devices have an over-sharp filter profile (not system-friendly).

SUMMARY OF THE INVENTION

An object of the present invention is to overcome the aforesaid problems and defects, at least partially.

This object is achieved in accordance with a first aspect of the invention by means of a device and a method for selective optical wavelength filtering. A filter includes a coupler or a circulator, a multiplexer/demultiplexer and a plurality of waveguides. Each of the plurality of waveguides includes a reflection section and a variable optical attenuator wherein the variable optical attenuator is disposed between the reflection section and the multiplexer/demultiplexer. One of the ports on the circulator or on the coupler is connected to a first side of the multiplexer/demultiplexer.

One advantage afforded by the present invention is that dispersion compensation can be achieved for each channel when the period in the grating structures is varied.

Another advantage afforded by the invention is that undesirable channels can be strongly suppressed.

One preferred embodiment affords the additional advantage of enabling desired channels to be amplified to great extent.

The invention will now be described in more detail with reference to preferred exemplifying embodiments thereof and with reference to the accompanying drawings.

DESCRIPTION OF PREFERRED EMBODIMENTS

Figure 1:
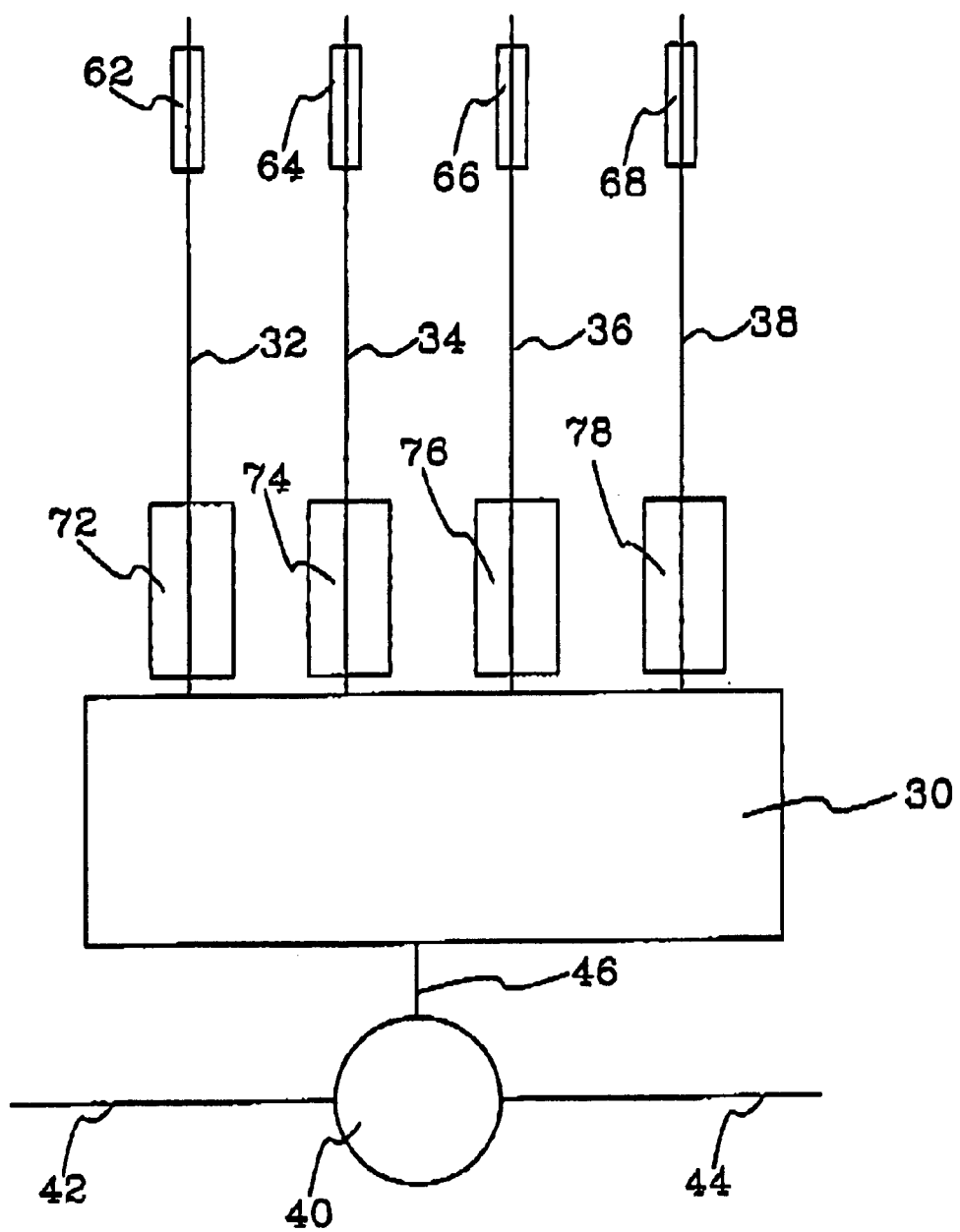
FIG. 1 illustrates one embodiment of an inventive optical filter.

FIG. 1 illustrates an embodiment of an inventive optical filter that includes four waveguides 32, 34, 36 and 38, four reflection sections 62, 64, 66 and 68, four variable optical attenuators 72, 74, 76 and 78, a four-channel multiplexer/demultiplexer 30, and a three-port optical circulator 40. The circulator 40 may include more than three ports and those ports that are not used actively in the device will preferably be plugged.

One port 46 of the optical circulator is connected to a first side of the four-channel (de)multiplexer 30. Four waveguides 32, 34, 36 and 38 are connected to the other side of the (de)multiplexer 30. Each waveguide 32, 34, 36 and 38 includes a reflection section 62, 64, 66 and 68 and a variable optical amplifier 72, 74, 76 and 78. The variable optical attenuators 72, 74, 76 and 78 are disposed between the (de)multiplexer 30 and respective reflection sections 62, 64, 66 and 68. The variable optical attenuators will preferably operate in the manner of an on/off switch.

The (de)multiplexer may be constructed in accordance with the MMIMZI (Multi Mode Interference Mach Zehnder Interferometer) principle. The reflection sections may be Bragg gratings. A 3 dB-switch or coupler may be used instead of an optical circulator, although use of the switch may result in additional losses which can be considered a disadvantage. Furthermore, there may occur a reflection which can give rise to problems in the transmission system as a whole.

Optical wavelength channels are transmitted in through a first port 42 on the optical circulator 40. These wavelength channels pass through the circulator and are transmitted out through a second port 46 thereon. The wavelength channels are transmitted into the (de)multiplexer 30 and demultiplexed out on four waveguides 32, 34, 36 and 38.

At least one wavelength channel is transmitted from the (de)multiplexer 30 to the waveguide 36, for instance. If it is assumed that this wavelength channel is undesirable, the channel is attenuated one time by the variable optical attenuator 72 prior to being reflected by the reflection section 62, and a second time after having been reflected by said reflection section. The wavelength channel then passes through the (de)multiplexer and is transmitted out on a third port 44 on the optical circulator 40.

Assume that a desired wavelength channel is transmitted to the waveguide 34 via the optical circulator and the (de)multiplexer. The wavelength channel passes through the variable optical attenuator practically unnoticed, both prior to being reflected by the reflection section and subsequent to being reflected thereby. The wavelength channel then passes through the (de)multiplexer and is transmitted out on a third circulator port 44.

Figure 2:
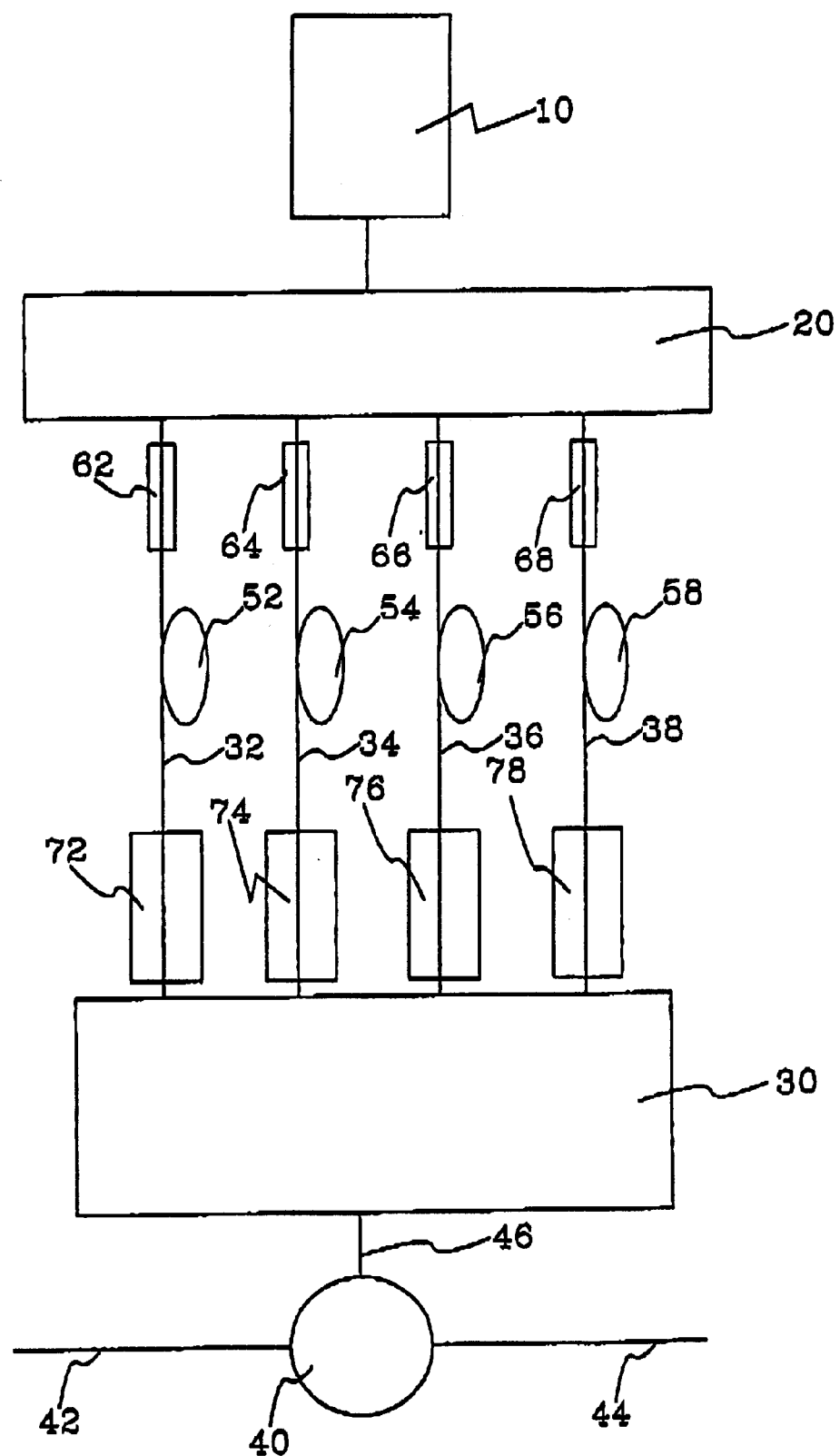
FIG. 2 illustrates another embodiment of an inventive optical filter.

FIG. 2 illustrates a second embodiment of an optical filter constructed in accordance with the invention. The filter includes four waveguides 32, 34, 36 and 38, four reflection sections 62, 64, 66 and 68, four variable optical attenuators 72, 74, 76 and 78, a four-channel multiplexer/demultiplexer 30, a switch 20, a pump laser 10, four amplifier sections 52, 54, 56 and 58 and a three-port optical circulator 40. The optical circulator can also be replaced with a 3 dB-switch or coupler in this case.

One of the ports, 46, of the optical circulator is connected to a first side of said four-channel (de)multiplexer 30. Four waveguides 32, 34, 36 and 38 are connected to the other side of the (de)multiplexer 30. Each waveguide 32, 34, 36 and 38 includes a reflection section 62, 64, 66 and 68, an amplifier section 52, 54, 56 and 58 and a variable optical attenuator 72, 74, 76 and 78. The variable optical attenuators 72, 74, 76 and 78 and the amplifier sections 52, 54, 56 and 58 are arranged between the (de)multiplexer 30 and respective reflection sections 62, 64, 66 and 68. The variable optical attenuator is placed nearest the (de)multiplexer 30 in the FIG. 2 illustration. The positions of the variable optical attenuator and the amplifier section can be reversed. The amplifier section may be a plain wavelength amplifier or a fibre amplifier. The variable optical attenuator may be doubled and be seated both upstream and downstream of the amplifier section. In order for the position of the variable optical attenuator (preferably with an on/off switch function) between the reflection section and the amplifier section to be meaningful, the attenuator will be made so insensitive to wavelength that both the power of the pump wavelength and the power of the signal wavelength can be influenced in the same way by the variable optical attenuator.

The (de)multiplexer may, for instance, be constructed in accordance with the MMIMZI (Multi Mode Interference Mach Zehnder Interferometer) principle. The reflection sections may be Bragg gratings, for instance. The amplifier sections may be fibre amplifiers, for instance. A 3 dB-coupler may be used instead of an optical circulator. The switch may be constructed in accordance with the MMIMZI (Multi Mode Interference Mach Zehnder Interferometer) principle.

Optical wavelength channels are transmitted in through a first port 42 on the optical circulator 40. These wavelength channels pass through the circulator and are transmitted out through a second circulator port 46. The wavelength channels are transmitted into the (de)multiplexer 30 and demultiplexed out on four waveguides 32, 34, 36 and 38.

Assume that the channel desired is the channel that is coupled to waveguide 34. The switch 20 is then set so as to connect the pump laser 10 to the waveguide 34 and passes through the amplifier section (54) and activates said section. The power of the signal reaching this amplifier section will then be amplified.

At least one wavelength channel is transmitted from the (de)multiplexer 30 to, for instance, the waveguide 32. If it is assumed that this wavelength channel is undesirable, the wavelength channel is attenuated once by the variable optical attenuator 72 prior to being reflected by the reflection section 62, and a second time after having been reflected by said reflection section. The wavelength channel passes through the (de)multiplexer and is transmitted out on a third port 44 of the optical circulator 40. This wavelength channel can be influenced to a greater or lesser extent by the amplifier section.

Assume that a desired wavelength channel is transmitted to the waveguide 34 via the optical circulator and the (de)multiplexer. This wavelength channel passes through the variable optical attenuator 74 practically unnoticed and can then be amplified via the amplifier section 54 before being reflected by the reflection section 64. Laser light is pumped from a pump laser 10, via a switch 20, into the waveguide in which it is desired to amplify a given wavelength. In the illustrated case, when the desired channel is located in waveguide 34, the switch 20 is set so that laser light will be pumped into said waveguide. After the wavelength channel has been reflected by the reflection section 64, the wavelength channel is amplified one more time via said amplifier section 54 and then passes practically unnoticed through the attenuator 74, which in the present case attenuates said wavelength minimally. The wavelength channel then passes into the (de)multiplexer and is transmitted out through a third port 44 on the optical circulator 40.

Each of the optical attenuators 72, 74, 76 and 78 can be handled individually, therewith enabling the signal strengths of the various wavelengths demultiplexed out to the different waveguides 32, 34, 36 and 38 can be controlled separately and independently of each other.

Figure 3:
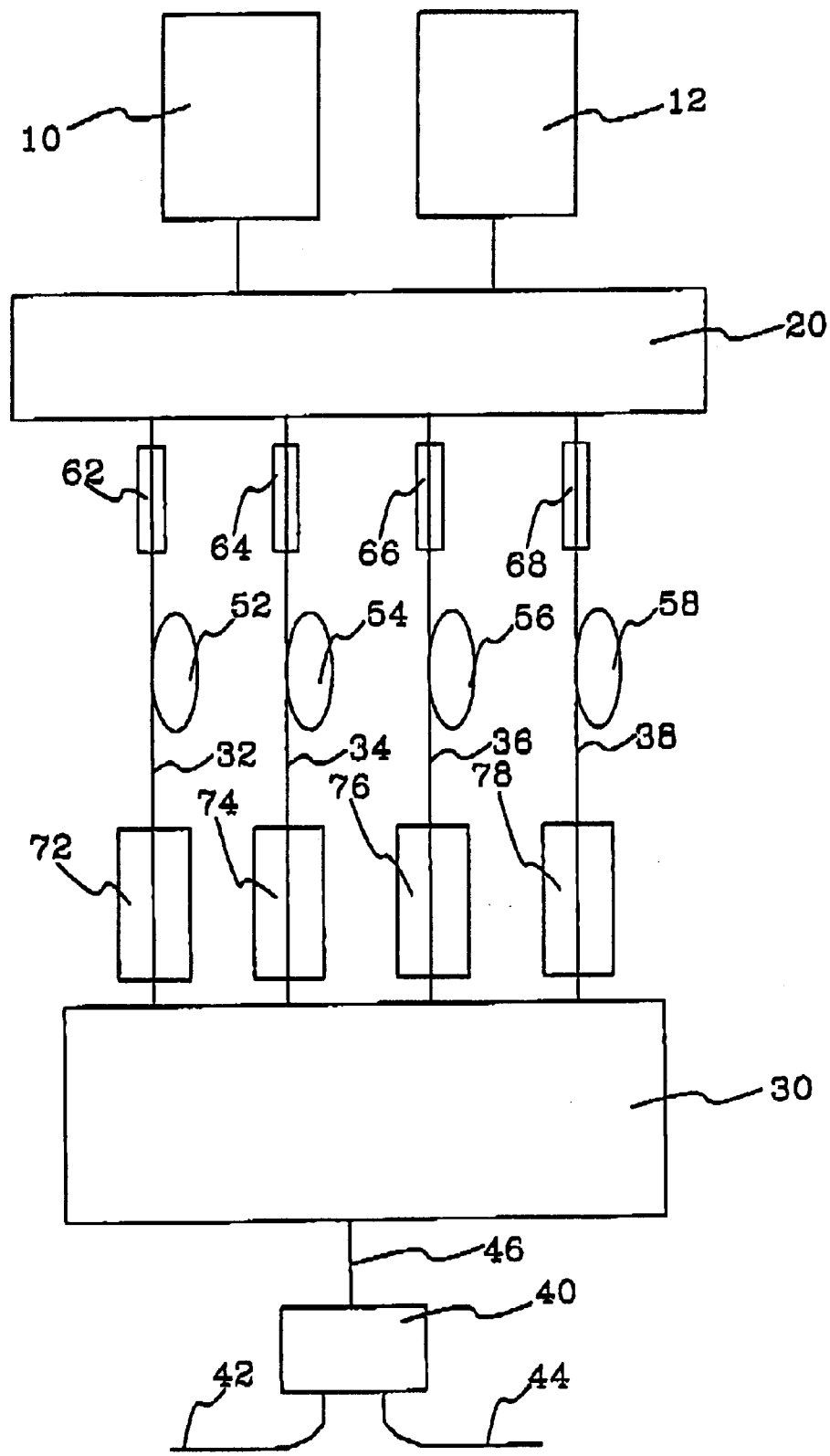
FIG. 3 illustrates a further embodiment of an inventive optical filter.

FIG. 3 illustrates another embodiment of an optic filter constructed in accordance with the invention. The filter includes two pump lasers 10 and 12, a switch 20 (which may be an MMIMZI-based switch), four waveguides 32, 34, 36 and 38, four amplifier sections 52, 54, 56 and 58, four reflections sections 62, 64, 66 and 68, four variable optical attenuators 72, 74, 76 and 78, a four-channel (de)multiplexer 30 and a 3 dB-coupler 40. As in the earlier mentioned cases, the 3 dB-coupler may be replaced with an optical circulator.

The 3 dB-coupler, or switch, is connected through one of its ports 46 to a first side of said four-channel (de) multiplexer 30. Four waveguides 32, 34, 36 and 38 are connected to a second side of the (de)multiplexer 30. Each waveguide 32, 34, 36 and 38 includes an amplifier section 52, 54, 56 and 58, a variable optical attenuator 72, 74, 76 and 78, and a reflection section 62, 64, 66 and 68. The amplifier section 52, 54, 56 and 58 and the variable optical attenuator 72, 74, 76 and 78 are disposed between the (de)multiplexer 30 and respective reflection sections 62, 64, 66 and 68. The pump lasers 10 and 12 are connected to a first side of the switch 20. In the illustrated case, the variable optical attenuators are arranged nearest the (de)multiplexer 30.

The positions of the amplifier sections and the variable optical attenuators can be reversed. One prerequisite for positioning the variable optical attenuator (preferably with an on/off switch function) between the reflection section and the amplifier section to be meaningful is that it can be given a wavelength insensitivity such that the power of the signal wavelength and the power of the pump wavelength can be influenced in the same way by the variable optical attenuator. The optical circulator can be replaced with a 3 dB-coupler.

Optical wavelength channels are transmitted in through a first port 42 of the 3 dB-coupler 40. These wavelength channels pass through the coupler and are transmitted out through a second coupler port 46. The wavelength channels are transmitted into the (de)multiplexer 30 and are demultiplexed out on four waveguides 32, 34, 36 and 38.

At least one wavelength channel is transmitted, e.g., to the waveguide 32 from the (de)multiplexer 30. If this wavelength channel is undesirable, the channel is attenuated for a first time by the variable optical attenuator 72 and then passes through the amplifier station and can be influenced by said section to a greater or lesser extent and thereafter reflected by the reflection section 62.

The wavelength channel then passes a second time through the amplifier section 52 and can be influenced thereby to a greater or lesser extent and thereafter attenuated in the attenuator 72 for a second time.

A desirable wavelength channel can be transmitted, e.g., to waveguide 34. This wavelength channel passes practically unnoticed through the attenuator 74 for a first time. The wavelength channel is then amplified by the amplifier section 54 for a first time prior to said wavelength channel being reflected by the reflection section 64. Amplification is controlled by pumping laser light into the waveguide in which amplification of a certain wavelength channel is desired. In the case of the illustrated embodiment, this laser light is pumped into the waveguide by means of two pump lasers 10 and 12, via a switch 20. The switch is set so that laser light will be excited into the correct waveguide. The pump lasers preferably operate with mutually the same amplification wavelength, although these wavelengths can, of course, differ from one another. Preferably, only one laser is switched-on while the other functions as a backup.

Subsequent to said wavelength channel having been reflected by the reflection section 64, the channel is amplified once more via the amplifier section 54, and then passes through the attenuator 74 practically unnoticed, said attenuator 74 attenuating said wavelength minimally in the illustrated case. The wavelength channel then passes into the (de)multiplexer and is transmitted out through a third port 44 on the 3 dB-coupler 40.

Each of the optical attenuators 72, 74, 76 and 78 can be handled individually, therewith enabling respective signal strengths of the different wavelengths that are demultiplexed out to the various waveguides 32, 34, 36 and 38 can be regulated separately and independent of each other.

Figure 4:
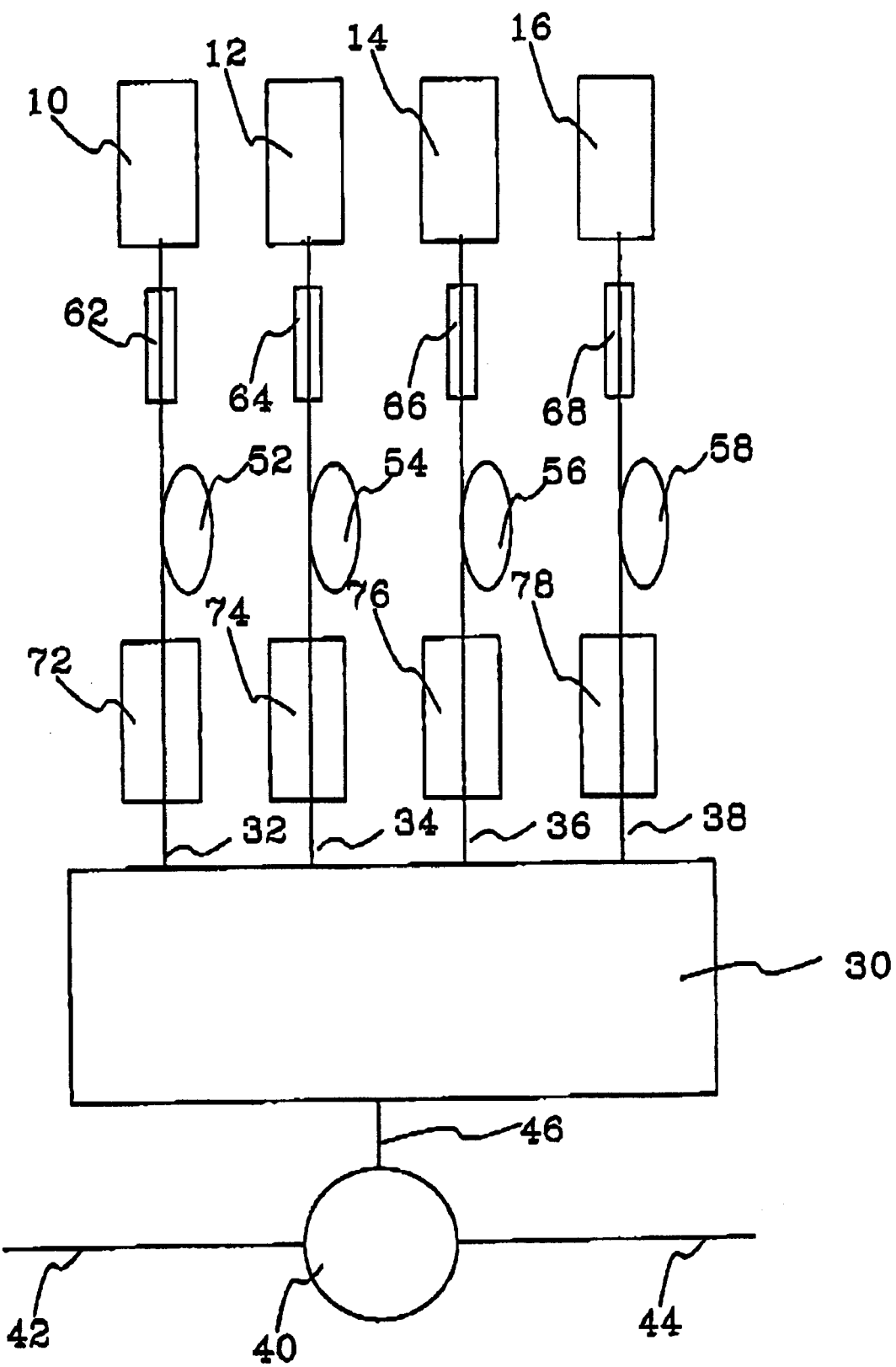
FIG. 4 illustrates still another embodiment of an inventive optical filter.

FIG. 4 illustrates a further embodiment of an inventive optic filter that can also be used as an amplifying channel equaliser. The channel equaliser includes four pump lasers 10, 12, 14 and 16, four waveguides 32, 34, 36 and 38, four amplifier sections 52, 54, 56 and 58, four reflection sections 62, 64, 66 and 68, four variable optical attenuators 72, 74, 76 and 78, a four-channel multiplexer/demultiplexer 30 and a three-port optical circulator 40.

One of the ports, 46, of the optical circulator 40 is connected to a first side of said four-channel (de)multiplexer 30. Four waveguides 32, 34, 36 and 38 are connected to the second side of the (de)multiplexer 30. Each waveguide 32, 34, 36 and 38 includes an amplifier section 52, 54, 56 and 58 and a reflection section 62, 64, 66 and 68, a variable optical attenuator 72, 74, 76 and 78 and a pump laser 10, 12, 14 and 16. The amplifier sections 52, 54, 56 and 58 and the variable optical attenuators 72, 74, 76 and 78 are disposed between the (de)multiplexer 30 and respective reflection sections 62, 64, 66 and 68. Respective pump lasers 10, 12, 14 and 16 are arranged at the end of each waveguide 32, 34, 36 and 38.

Optical wavelength channels are transmitted in through a first port 42 of the optical circulator 40. These wavelength channels pass through the circulator and are transmitted out through a second port 46 thereon. The wavelength channels are transmitted into the (de)multiplexer 30 and demultiplexed out on four waveguides 32, 34, 36 and 38.

At least one wavelength channel is transmitted from the (de)multiplexer 30 to the waveguide 32, for instance. If this wavelength channel is undesirable, it is attenuated a first time by the variable optical attenuator 72 and then passed through the amplifier section 52 in which it can be influenced to a greater or lesser extent, and thereafter reflected by the reflection section 62.

The wavelength channel then passes a second time through the amplifier section 52 a second time, in which it is influenced to a greater or lesser extent, and thereafter attenuated a second time by the variable optical attenuator 72. The wavelength channel then passes through the (de)multiplexer and is transmitted out through a third port on the optical circulator.

A desired wavelength channel can be coupled to wave conductor 34, for instance. This wavelength channel passes practically unnoticed through the attenuator 74 a first time. The wavelength channel is then amplified in the amplifier section 54 for a first time prior to said wavelength channel being reflected by the reflection section 64. Amplification is controlled by pumping laser light into the waveguide in which amplification of a certain wavelength channel is desired. In the case of the illustrated embodiment, the laser light is pumped by a pump laser 12 provided at the end of the waveguide 34. After the wavelength channel has been reflected by the reflection section 64, the wavelength channel is amplified for a second time by the amplifier section 54 and then passes practically unnoticed through the variable optical attenuator 74. The wavelength channel then passes through the (de)multiplexer 30 and is transmitted out through a third port 44 on the circulator 40.

Each of the pump lasers is able to transmit with different powers independently of one another, i.e. respective pump lasers 10, 12, 14 and 16 regulate the extent to which the amplifier sections 52, 54, 56 and 58 shall amplify, therewith enabling respective signal strengths of the various wavelengths that are demultiplexed out to the different waveguides 32, 34, 36 and 38 can be regulated separately and independently of each other.

Figure 5:
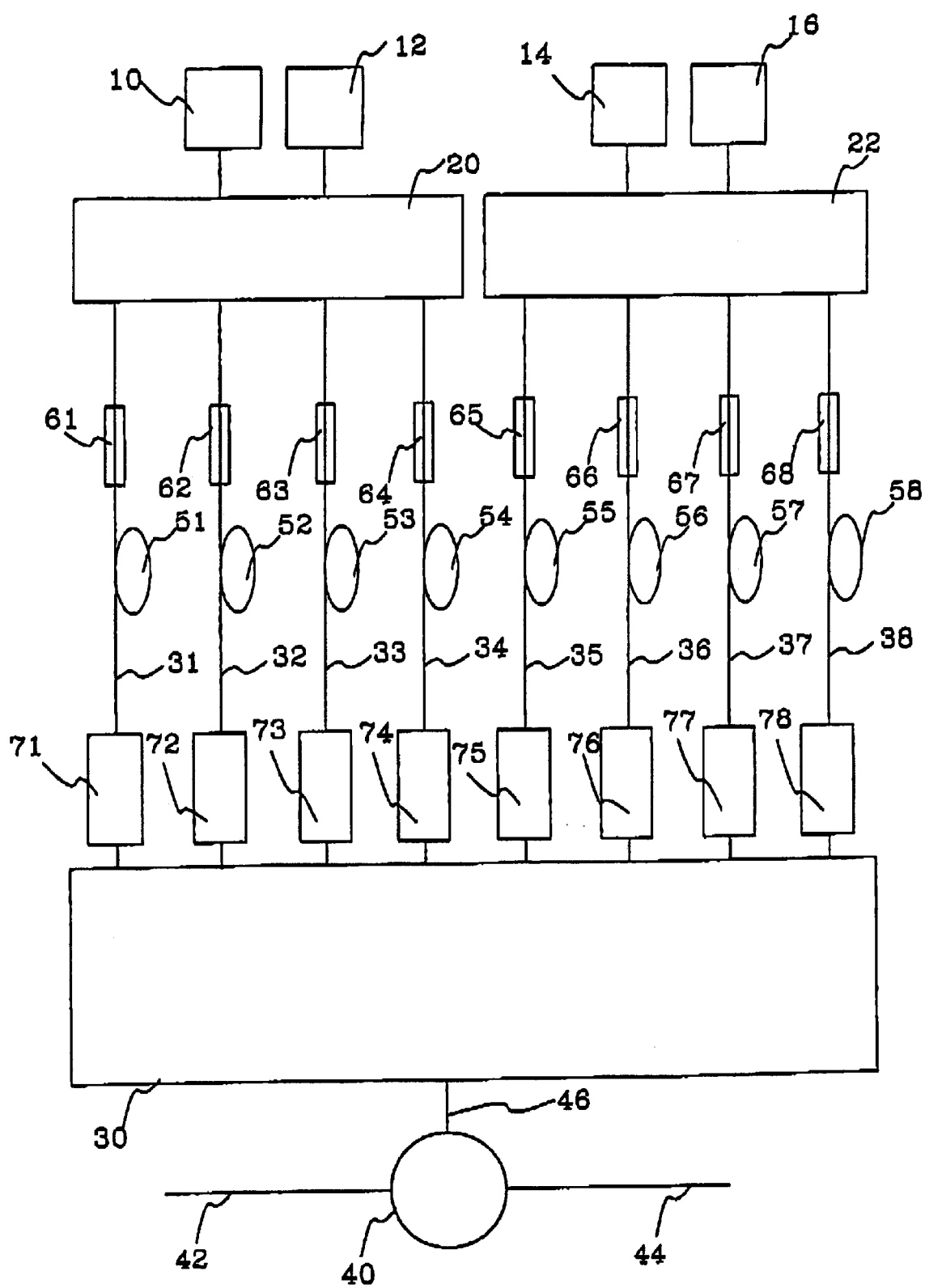
FIG. 5 illustrates yet another embodiment of an inventive optical filter.

FIG. 5 illustrates yet another embodiment of an inventive filter. The filter includes pump lasers 10, 12, 14 and 16, two switches 20 and 22, eight waveguides 31, 32, 33, 34, 35, 36, 37 and 38, eight amplifier sections 51, 52, 53, 54, 55, 56, 57 and 58, eight reflection sections 61, 62, 63, 64, 65, 66, 67 and 68, eight variable optical attenuators 71, 72, 73, 74, 76, 76, 77 and 78, one eight-channel (de)multiplexer 30 and one three-port optical circulator 40.

One of the ports, 46, of the optical circulator is connected to a first side of said eight-channel (de)multiplexer 30. Eight waveguides 31, 32, 33, 34, 35, 36, 37 and 38 are connected to the second side of the (de)multiplexer 30. Each waveguide 31, 32, 33, 34, 35, 36, 37 and 38 includes an amplifier section 51, 52, 53, 54, 55, 56, 57 and 58, a variable optical attenuator 71, 72, 73, 74, 75, 76, 77 and 78, and a reflection section 61, 62, 63, 64, 65, 66, 67 and 68. The amplifier sections 51, 52, 53, 54, 55, 56, 57 and 58 and the variable optical attenuators 71, 72, 73, 74, 75, 76, 77 and 78 are arranged between the (de)multiplexer 30 and respective reflection sections 61, 62, 63, 64, 65, 66, 67 and 68. The pump lasers 10 and 12 are connected to a first side of the switch 20, while pump lasers 14 and 16 are connected to a first side of the switch 22. The pump lasers 10 and 12 preferably operate at mutually the same wavelengths. The pump lasers 14 and 16 also preferably operate at mutually the same wavelengths, these wavelengths either being the same as those at which the pump lasers 10 and 12 operate or differ therefrom. The waveguides 31, 32, 33 and 34 are connected to a second side of the switch 20, while the waveguides 35, 36, 37 and 38 are connected to a second side of the switch 22.

Optical wavelength channels are transmitted in through a first port 42 on the optical circulator 40. These wavelength channels pass through the circulator and are transmitted out through a second port 46 thereon. The wavelength channels are transmitted into the (de)multiplexer 30 and demultiplexed out on eight waveguides 31, 32, 33, 34, 35, 36, 37 and 38.

At least one wavelength channel is transmitted from the (de)multiplexer 30 to the waveguide 31, for instance. If this wavelength channel is undesired, the channel is attenuated for a first time by the variable optical attenuator 71, and thereafter passes through the amplifier section 51 in which it can be influenced to a greater or lesser extent thereby, and is thereafter reflected by the reflection section 61.

The wavelength channel then passes for a second time through the amplifier section 51 and can again be influenced to a greater or lesser extent thereby, and thereafter attenuated for a second time by the variable optical attenuator 71. The wavelength channel then passes into the (de)multiplexer and in transmitted out through a third port 44 on the optical circulator 40.

A desired wavelength channel can be transmitted to waveguide 35, for instance. This wavelength channel passes through the attenuator 75 for a first time, practically unnoticed. The wavelength channel is thereafter amplified by the amplifier section 55 for a first time, prior to said channel being reflected by the reflection section 65. Amplification is controlled by pumping laser light into the waveguide in which it is desired to amplify a certain wavelength channel. In the case of this embodiment, the laser light is pumped by two pump lasers 14 and 16 connected via a switch 22. The two lasers will preferably operate one at a time.

After the wavelength channel has been reflected by the reflection section 65, the channel is amplified for a second time by the amplifier section 55 and then passes through the variable optical attenuator 75 practically unnoticed.

The wavelength channels then pass through the (de)multiplexer 30 and are transmitted out through a third port 44 on the circulator 40.

Each of the variable optical attenuators 71, 72, 73, 74, 75, 76, 77 and 78 can be handled individually, thereby enabling the respective signal strengths of the various wavelengths that are demultiplexed out to the different waveguides 31, 32, 33, 34, 35, 36, 37 and 38 can be regulated separately and independently of each other. As earlier mentioned, the variable optical attenuators operate in a manner similar to an on/off switch.

Figure 6:
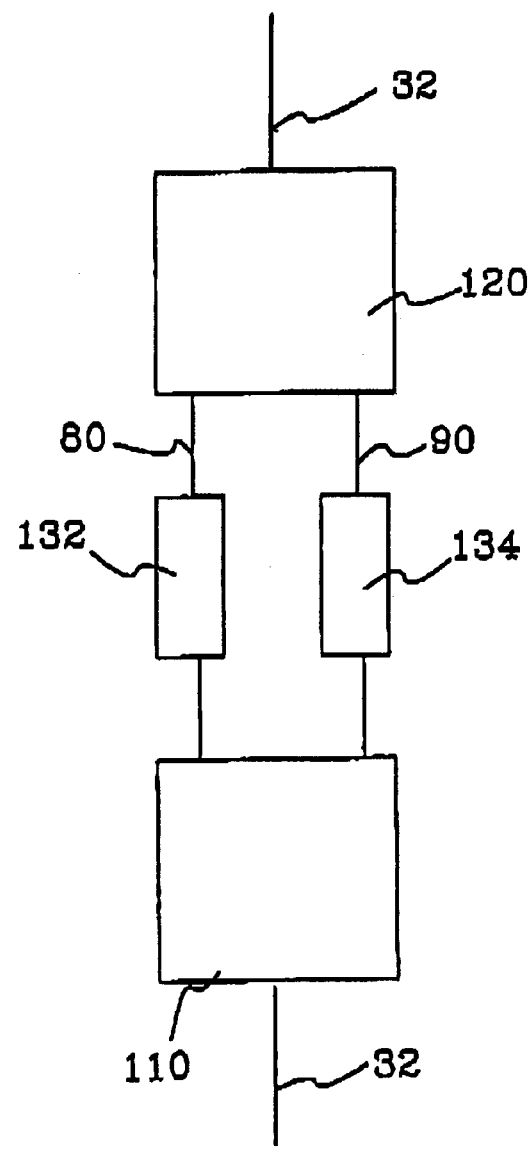
FIG. 6 illustrates an example of a variable attenuator that can be used with the invention.

FIG. 6 illustrates a variable optical attenuator that can be used to advantage in the invention. The variable optical attenuator includes two 1×2 MMI-waveguides 110 and 120, two Mach Zehnder waveguides 80 and 90, a phase control element 132 and a trim section 134. The MMI-waveguides 110 and 120 are connected together via said two Mach Zehnder waveguides 80 and 90. A first Mach Zehnder waveguide 80 includes said phase control element 132, and a second Mach Zehnder waveguide 90 includes said trim section 134.

It will be understood that the invention is not restricted to the aforedescribed and illustrated exemplifying embodiments thereof, and that modifications can be made within the scope of the accompanying claims.

What is claimed is:

1. An optical wavelength selective filter, comprising:
   3 dB-coupler or at least one Q-port circulator, where $Q \geq 3$;
   a 1×N WDM-(de)multiplexer, where $N \geq 2$;
   N number of waveguides;, where one of the ports on the circulator or on the 3 dB-coupler is connected to a first side of the WDM-(de)multiplexer, and
   wherein each waveguide includes
      at least one variable optical attenuator; and
      at least one reflection section, such that at least one variable optical attenuator is disposed between a reflection section and the WDM-(de)multiplexer.

2. An optical wavelength selective filter according to claim 1, wherein the reflection section is a Bragg grating.

3. An optical wavelength selective filter according to claim 1, wherein the filter further comprises:
   at least one amplifier section arranged in each of the waveguides between respective reflection sections and the WDM-(de)multiplexer; and
   at least one pump laser adapted to pump light through the amplifier sections in a direction towards the WDM-(de)multiplexer in at least one waveguide.

4. An optical wavelength selective filter according to claim 3, wherein at least one laser is adapted to pump power to each waveguide in a direction towards the WDM-(de)multiplexer.

5. An optical wavelength selective filter according to claim 3, wherein at least one optical switch is arranged between said laser and the reflection sections.

6. An optical wavelength selective filter according to claim 5, wherein when at least two pump lasers are provided for each optical switch, at least one laser transmits laser light at a wavelength that is different to the wavelengths of the light emitted by the other lasers.

7. An optical wavelength selective filter according to claim 1, wherein the optical switch is of the MMIMZI-type (Multi Mode Interference Mach Zehnder Interferometer) or a digital switch.

8. An optical wavelength selective filter comprising:
   3 dB-coupler or at least one Q-port circulator, where $Q \geq 3$;
   a 1×N WDM-(de)multiplexer, where $N \geq 2$;
   N number of waveguides, where one of the ports on the circulator or on the 3 dB-coupler is connected to a first side of the WDM-(de)multiplexer, wherein each waveguide includes
      at least one variable optical attenuator; and
      at least one reflection section, such that at least one variable optical attenuator is disposed between a reflection section and the WDM-(de)multiplexer;
   wherein the variable optical attenuators are of the MMIMZI-type (Multi Mode Interference Mach Zehnder Interferometer) comprising two MMI-waveguides which are mutually connected via two Mach Zehnder waveguides, wherein a first Mach Zehnder waveguide includes at least one trim section, and wherein a second Mach Zehnder waveguide includes at least one phase control element.

9. A method of selectively filtering at least one wavelength from a group of wavelengths, comprising:
   transmitting optical wavelength channels to a first side of a WDM-(de)multiplexer via an optical circulator or a 3 dB-coupler;
   transmitting N number of different wavelength channels through N number of different waveguides connected to a second side of the WDM-(de)multiplexer, where $N \geq 2$;
   attenuating at least one but at most N−1 number of optical wavelength channels prior to said channel or channels being reflected by a wavelength selective reflection section; and transmitting the reflected optical wavelength channels through said WDM-(de)multiplexer and from there through said circulator or 3 dB-coupler.

10. A method according to claim 9, further comprising the step of:

amplifying at most N−1 number of optical wavelength channels prior to said channels being reflected by a wavelength selective reflection section, wherein the remaining wavelength channels are not amplified.

11. A method according to claim 10, further comprising the step of:

pumping laser light through at least one amplifier section in a direction towards the WDM-(de)multiplexer.

12. A method according to claim 11, further comprising the step of:

pumping the laser light by means of at least one laser connected to the waveguides via at least one optical switch.

13. A method according to claim 11, further comprising the step of:

pumping said laser light from at least two lasers per splitter, where at least one laser wavelength differs from the remainder.

14. A method according to claim 11, wherein the laser light is pumped by a laser connected to each of said waveguides.

15. A method according to claim 10, further comprising the step of:

attenuating the wavelength channels by means of an MMIMZI (Multi Mode Interference Mach Zehnder Interferometer).

16. An optical wavelength selective filter comprising:

coupler or a circulator;

a multiplexer/demultiplexer; and a plurality of waveguides, wherein each of the plurality of waveguides includes a reflection section; and a variable optical attenuator wherein the variable optical attenuator is disposed between the reflection section and the multiplexer/demultiplexer;

wherein one of the ports on the circulator or on the coupler is connected to a first side of the multiplexer/demultiplexer.

17. An optical wavelength selective filter according to claim 16, wherein the reflection section is a Bragg grating.

18. An optical wavelength selective filter according to claim 16, wherein the filter further comprises:

an amplifier section arranged in each of the plurality of waveguides between the reflection sections and the multiplexer/demultiplexer; and at least one pump laser adapted to pump light through the amplifier sections in a direction towards the multiplexer/demultiplexer in at least one of the plurality of waveguides.

19. An optical wavelength selective filter according to claim 18, wherein at least one laser is adapted to pump power to each of the plurality of waveguides in a direction towards the multiplexer/demultiplexer.

20. An optical wavelength selective filter according to claim 18, further comprising:

an optical switch arranged between said laser and the reflection sections of the plurality of waveguides.

21. An optical wavelength selective filter according to claim 20, wherein the laser comprises a first pump laser and a second pump laser, and wherein the optical switch includes a first optical switch disposed between the first pump laser and one of the plurality of waveguides and a second optical switch disposed of between the second pump laser and another one of the plurality of waveguides, and wherein the first pump laser transmits laser light at a wavelength that is different to the wavelength of the light emitted by the second pump laser.

* * * * *